United States Patent
Mishima et al.

(10) Patent No.: US 8,621,841 B2
(45) Date of Patent: Jan. 7, 2014

(54) GASIFICATION POWER GENERATION SYSTEM PROVIDED WITH CARBON DIOXIDE SEPARATION AND RECOVERY DEVICE

(75) Inventors: Nobuyoshi Mishima, Hitachi (JP); Yasushi Takeda, Hitachi (JP); Kishu Hosoi, Hitachi (JP); Hirotsugu Fukuhara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 590 days.

(21) Appl. No.: 12/942,777

(22) Filed: Nov. 9, 2010

(65) Prior Publication Data

US 2011/0107737 A1     May 12, 2011

(30) Foreign Application Priority Data

Nov. 10, 2009   (JP) ................................ 2009-256700

(51) Int. Cl.
*F02C 3/20*     (2006.01)
*F02C 6/00*     (2006.01)

(52) U.S. Cl.
USPC .................................... 60/39.461; 60/39.182

(58) Field of Classification Search
USPC ............... 60/39.461, 39.462, 39.464, 39.465, 60/39.182
See application file for complete search history.

(56) References Cited

U.S. PATENT DOCUMENTS

| | | | | |
|---|---|---|---|---|
| 4,631,915 A | * | 12/1986 | Frewer et al. | 60/39.12 |
| 4,881,366 A | * | 11/1989 | Nurse | 60/772 |
| 5,134,944 A | * | 8/1992 | Keller et al. | 110/234 |
| 6,976,362 B2 | * | 12/2005 | Sheppard et al. | 60/780 |
| 2008/0155984 A1 | | 7/2008 | Liu et al. | |

FOREIGN PATENT DOCUMENTS

| | | |
|---|---|---|
| JP | 7-119491 A | 5/1995 |
| JP | 2008-108621 A | 5/2008 |
| JP | 2008-163944 A | 7/2008 |

OTHER PUBLICATIONS

Canadian Office Action dated Jul. 24, 2013 (three (3) pages).

* cited by examiner

*Primary Examiner* — Gerald L Sung
(74) *Attorney, Agent, or Firm* — Crowell & Moring LLP

(57) ABSTRACT

A gasification power generation system provided with a carbon dioxide separation and recovery device is disclosed. The system includes a carbon dioxide separation and recovery device having a shift reactor to convert carbon monoxide contained in fuel gas into carbon dioxide by mixing steam into the fuel gas containing carbon monoxide and hydrogen to cause a shift reaction; a carbon dioxide absorption tower to produce fuel gas from which carbon dioxide has been removed by allowing an absorption liquid to absorb carbon dioxide from the fuel gas containing carbon dioxide flowing down the shift reactor; an absorption liquid recycling device to recycle an absorption liquid by separating carbon dioxide absorbed by the absorption liquid in the carbon dioxide absorption tower; and a gasification power generation system.

6 Claims, 6 Drawing Sheets

GASIFICATION POWER GENERATION SYSTEM PROVIDED WITH CARBON DIOXIDE SEPARATION AND RECOVERY DEVICE

CLAIM OF PRIORITY

The present application claims priority from Japanese patent application serial No. 2009-256700, filed on Nov. 10, 2009, the content of which is hereby incorporated by reference into this application.

BACKGROUND OF THE INVENTION

1. Field of the Invention

The present invention relates to an integrated gasification combined cycle system provided with a carbon dioxide separation and recovery device and, in particular, to a gasification power generation system provided with a carbon dioxide separation and recovery device in which carbon dioxide contained in exhaust gas discharged from a gas turbine is recovered in the carbon dioxide separation and recovery device, and shift reaction heat generated by a shift reaction to convert carbon monoxide into carbon dioxide is effectively recovered in a shift reactor of the carbon dioxide separation and recovery device in an integrated gasification combined cycle system which generates power by burning gasified fuel gas containing carbon monoxide and hydrogen in a gas turbine.

2. Description of Related Art

There have been techniques to gasify coal and biomass to be used as fuel for gas turbines. In the case of coal gasification, in particular, the representative components of the gas produced are carbon monoxide (55% by volume), hydrogen (20%), nitrogen (20%), carbon dioxide (3%), steam (2%), and others, although they may vary depending on the type of coal.

Therefore, the shift reaction to obtain carbon dioxide and hydrogen from carbon monoxide and steam, the main components of gas produced in coal gasification, represented by the following equation (1) is generally used in carbon dioxide recovery systems at chemical plants, etc.

$$CO + H_2O \rightarrow CO_2 + H_2 \tag{1}$$

More specifically, a shift reaction represented by the equation (1) above is caused in a shift reactor, gasified coal is converted into hydrogen and carbon dioxide, then the hydrogen is used as fuel gas for a gas turbine, and the carbon dioxide is absorbed by an absorption liquid at a carbon dioxide absorption tower. This shift reaction is an exothermic reaction.

Japanese Patent Laid-open No. 2008-108621 discloses a technique concerning a fuel cell power generation system provided with a carbon dioxide recovery device having a shift reactor in which a shift reaction converts carbon monoxide into carbon dioxide.

Patent Document 1: Japanese Patent Laid-open No. 2008-108621

SUMMARY OF THE INVENTION

Unfortunately, however, in the power generation system provided with the carbon dioxide recovery device described in Japanese Patent Laid-open No. 2008-108621, the heat energy generated by a shift reaction to convert carbon monoxide in a fuel gas into carbon dioxide in the shift reactor of the carbon dioxide recovery device is not effectively used in the power generation system, and therefore the power generation efficiency of the power generation system is not improved.

An object of the present invention, in a gasification power generation system which generates power by burning a gasified fuel gas containing carbon monoxide in a gas turbine, provides a gasification power generation system provided with a carbon dioxide separation and recovery device in which shift reaction heat generated by a shift reaction to convert carbon monoxide contained in a fuel gas into carbon dioxide is effectively recovered in the carbon dioxide separation and recovery device to recover carbon dioxide, and shift steam to supply steam generated by an exhaust heat recovery boiler to a steam mixer is reduced, thereby improving power generation efficiency in a gasification power generation system.

In accordance with an aspect of the present invention, a gasification power generation system provided with a carbon dioxide separation and recovery device comprising: a carbon dioxide separation and recovery device having: a shift reactor to convert carbon monoxide contained in fuel gas into carbon dioxide by mixing steam into the fuel gas containing carbon monoxide and hydrogen to cause a shift reaction; a carbon dioxide absorption tower to produce fuel gas from which carbon dioxide has been removed by allowing an absorption liquid to absorb carbon dioxide from the fuel gas containing carbon dioxide flowing down the shift reactor; and an absorption liquid recycling device to recycle an absorption liquid by separating carbon dioxide absorbed by the absorption liquid in the carbon dioxide absorption tower; and a gasification power generation system having: a gas turbine device driven by burning the fuel gas from which carbon dioxide has been removed in the carbon dioxide absorption tower of the carbon dioxide separation and recovery device in a combustor; an exhaust heat recovery boiler having a drum to generate steam by an exhaust gas discharged from the gas turbine device; and a steam turbine driven by the steam generated by the drum of the exhaust heat recovery boiler; wherein an evaporator to generate steam heated by heat exchange with the fuel gas heated by shift reaction heat generated in the shift reactor of the carbon dioxide separation and recovery device is disposed downstream of the shift reactor, a steam line to supply a steam mixer disposed in a fuel gas line upstream of the shift reactor with the heated steam generated by the evaporator is provided, and the heated steam supplied through the steam line is allowed to flow from the steam mixer into the shift reactor as shift steam together with the fuel gas.

Also, in accordance with another aspect of the present invention, a gasification power generation system provided with a carbon dioxide separation and recovery device comprising: a carbon dioxide separation and recovery device having: a first shift reactor and a second shift reactor disposed downstream of the first shift reactor to convert carbon monoxide in fuel gas into carbon dioxide by mixing steam into the fuel gas containing carbon monoxide and hydrogen to cause a shift reaction; a carbon dioxide absorption tower to produce fuel gas from which carbon dioxide has been removed by allowing an absorption liquid to absorb carbon dioxide from the fuel gas containing carbon dioxide flowing down both of the shift reactors; and an absorption liquid recycling device to recycle an absorption liquid by separating carbon dioxide absorbed by the absorption liquid in the carbon dioxide absorption tower; a gasification power generation system having: a gas turbine device driven by burning the fuel gas from which carbon dioxide has been removed in the carbon dioxide absorption tower of the carbon dioxide separation and recovery device in a combustor; an exhaust heat recovery boiler having a drum to generate steam by an exhaust gas discharged from the gas turbine device; and a steam turbine driven by the steam generated by the drum of the exhaust heat recovery boiler; wherein a first evaporator to generate steam heated by heat exchange with the fuel gas heated by shift reaction heat generated in the first shift reactor of the carbon dioxide separation and recovery device is disposed downstream of the first shift reactor, a second evaporator to generate steam heated by heat exchange with the fuel gas heated by shift reaction heat generated in the second shift reactor of the carbon dioxide separation and recovery device is disposed downstream of the second shift reactor, steam lines to supply a steam mixer disposed in a fuel gas line upstream of the first shift reactor with the heated steam generated by each of the first and second evaporators are provided, and the heated steam supplied through these steam lines is allowed to flow from the steam mixer into the first shift reactor and the second shift reactor as shift steam together with the fuel gas.

According to the present invention, in a gasification power generation system which generates power by burning a gasified fuel gas containing carbon monoxide in a gas turbine, there can be provided a gasification power generation system provided with a carbon dioxide separation and recovery device in which shift reaction heat generated by a shift reaction to convert carbon monoxide contained in a fuel gas into carbon dioxide is effectively recovered in the carbon dioxide separation and recovery device to recover carbon dioxide, and shift steam to supply steam generated by an exhaust heat recovery boiler to a steam mixer is reduced, thereby improving the power generation efficiency of the power generation system.

DETAILED DESCRIPTION OF THE INVENTION

The embodiments of the gasification power generation system provided with a carbon dioxide separation and recovery device of the present invention are described hereinafter with reference to the accompanying drawings.

Embodiment 1

The first embodiment of the gasification power generation system provided with a carbon dioxide separation and recovery device of the present invention is described hereinafter with reference to FIG. 1 and FIG. 3.

Figure 1:
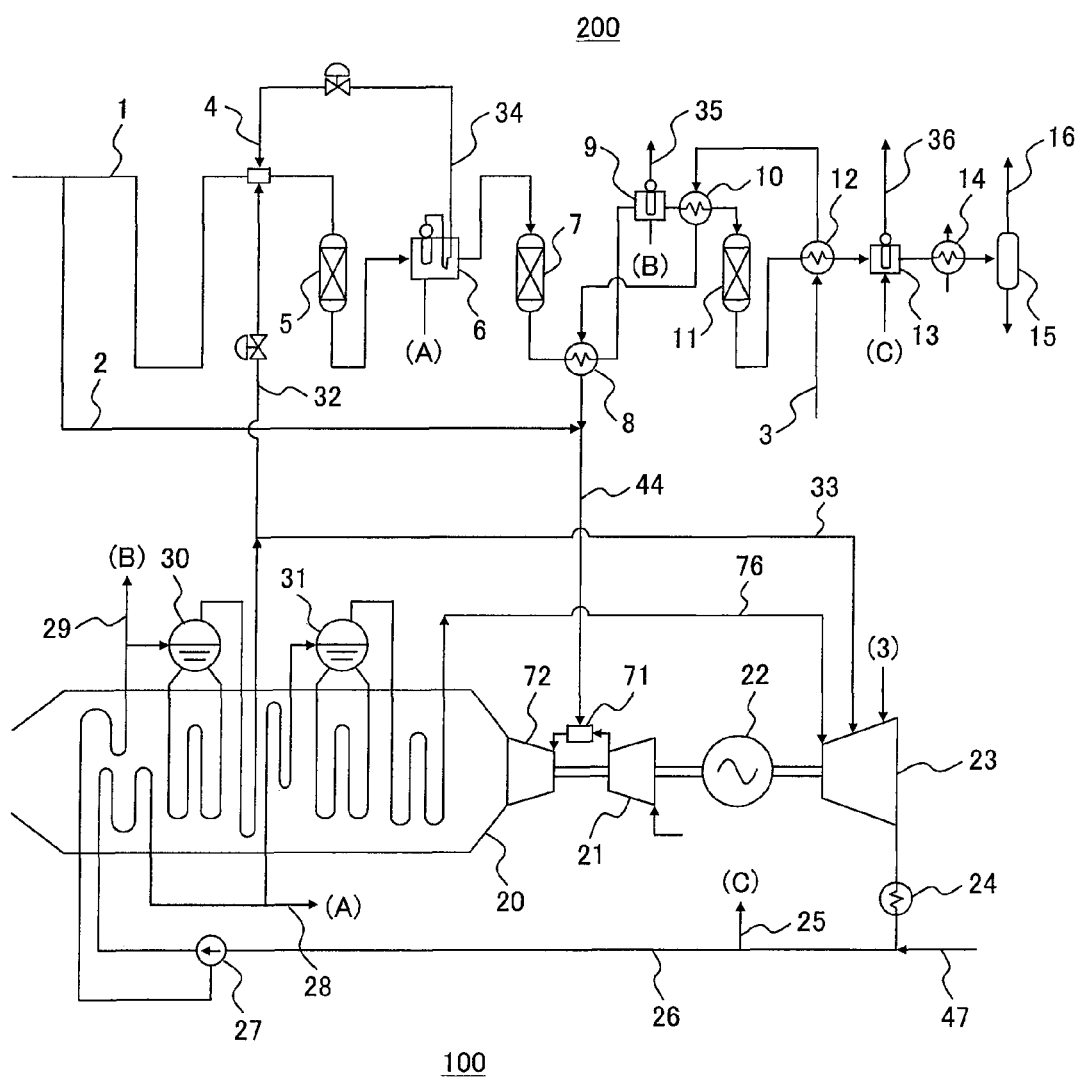
FIG. 1 is a schematic flow diagram of a coal gasification power generation system provided with a carbon dioxide separation and recovery device that improves heat efficiency and brings about positive economic effects in accordance with a first embodiment of the present invention.

FIG. 1 is a schematic flow diagram of a highly efficient gasification power generation system provided with a carbon dioxide separation and recovery device in accordance with the first embodiment of the present invention. FIG. 3 is a flow diagram showing a schematic framework of a shift reactor peripheral system, a carbon dioxide absorption liquid circulation system, and a absorption liquid recycling flash system which make up the carbon dioxide separation and recovery device provided in the gasification power generation system in the first embodiment of the present invention shown in FIG. 1.

Figure 3:
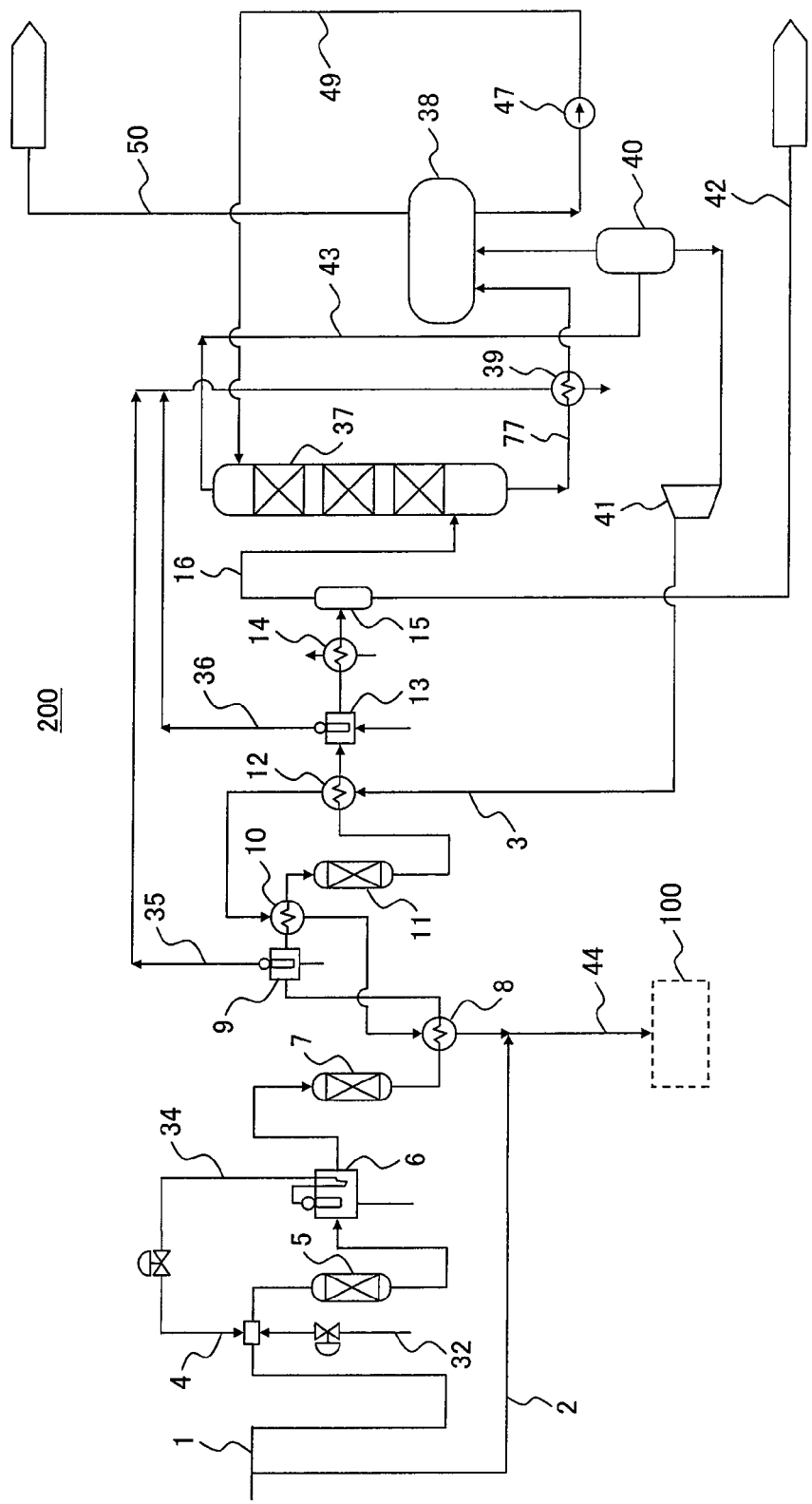
FIG. 3 is a flow diagram showing a schematic framework of the carbon dioxide separation and recovery device provided in the gasification power generation system in the first embodiment of the present invention shown in FIG. 1.

In FIG. 1 and FIG. 3, the gasification power generation system provided with a carbon dioxide separation and recovery device in accordance with the present embodiment includes a power generation plant 100 and a carbon dioxide separation and recovery device 200 which is supplied with a hydrogen-rich fuel gas containing carbon monoxide from a coal gasification device (not shown in the figures) through an inlet port gas line 1.

The power generation plant 100 provided in the gasification power generation system in the present embodiment is provided with a gas turbine device which includes a gas turbine 72 driven by combustion gas generated by burning a hydrogen-rich gas in a combustor 71, an exhaust heat recovery boiler 20 which generates steam using exhaust gas discharged from the gas turbine 72 as a heat source, and a steam turbine 23 driven by steam supplied from a intermediate-pressure drum 30 and a high-pressure drum 31 disposed in the exhaust heat recovery boiler 20 through a intermediate-pressure drum super-heated steam line 33 and a high-pressure drum super-heated steam line 76, respectively.

The steam turbine 23 drives a generator 22 to generate electric power. The steam flowing down this steam turbine 23 is cooled in a condenser 24 to become a condensed water, which is pressurized by a feed-water pump 27 and supplied through a condensate line 26 to the exhaust heat recovery boiler 20.

The gas turbine device is provided with the combustor 71 to burn fuel gas, the gas turbine 21 driven by combustion gas generated in the combustor 71, a compressor 72 to pressurize air supplied to the combustor 71, and the generator 22 to generate electric power.

In the carbon dioxide separation and recovery device 200, part of the steam generated in the exhaust heat recovery boiler 20 of the power generation plant 100 is supplied through a reaction steam line 32 to a shift steam mixer 4 provided in the inlet port gas line 1 which allows a hydrogen-rich fuel gas containing carbon monoxide supplied from the coal gasification device (not shown in the figures) to flow down. This fuel gas mixed with steam flows down the inlet port gas line 1 into a first shift reactor 5.

A shift reactor bypass line 2 is disposed in the inlet port gas line 1 so that it is branched off from the inlet port gas line 1 to connect to a combustor inlet port line 44 to bypass the shift reactor.

The inside of the first shift reactor 5 is filled with a catalyst to cause a shift reaction to convert carbon monoxide in the fuel gas into carbon dioxide. This catalyst converts carbon monoxide in the fuel gas into carbon dioxide by a shift reaction. Since this shift reaction is an exothermic reaction, the fuel gas containing converted carbon dioxide is heated by shift reaction heat to a high temperature.

In the carbon dioxide separation and recovery device provided in the gasification power generation system in the present embodiment, fuel gas heated by shift reaction heat generated when carbon monoxide is converted into carbon dioxide in the first shift reactor 5 is used as a heat source and supplied to a first process gas evaporator 6 described below which is disposed downstream of the first shift reactor 5 so that hot steam is generated in the first process gas evaporator 6.

The first process gas evaporator 6 is supplied with part of the steam generated in the exhaust heat recovery boiler 20 through a feed-water line 28. The hot steam generated by heat exchange with the fuel gas in the first process gas evaporator 6 is supplied through a steam line 34 to the shift steam mixer 4 disposed in the inlet port gas line 1 upstream of the first shift reactor 5 and flows into the first shift reactor 5 as shift steam to be used for a shift reaction together with the fuel gas flowing down the inlet port gas line 1.

Since the hot steam generated by heat exchange with hot fuel gas in the first process gas evaporator 6 is used as shift steam necessary for a shift reaction in a shift reactor, as described above, the amount of auxiliary steam which is supplied from the exhaust heat boiler 20 to the shift steam mixer 4 through the steam line 32 to be used as shift steam in the first shift reactor 5 can be reduced.

The hot fuel gas from the first shift reactor 5 is cooled in the first process gas evaporator 6 disposed downstream of the first shift reactor 5 by heat exchange with the steam supplied from the exhaust heat boiler 20 through the steam line 28.

The fuel gas cooled by heat exchange in the first process gas evaporator 6 flows into a second shift reactor 7 disposed downstream of the first process gas evaporator 6.

The inside of the second shift reactor 7 is also filled with a catalyst to cause a shift reaction to convert carbon monoxide in fuel gas into carbon dioxide. This catalyst filling the second shift reactor 7 facilitates the shift reaction to convert carbon monoxide in a fuel gas into carbon dioxide. Also, the fuel gas is heated again by this shift reaction heat to a high temperature.

The hot fuel gas from the second shift reactor 7 flows into a first fuel gas heater 8 disposed downstream of the second shift reactor 7.

This first fuel gas heater 8 is supplied with a hydrogen-rich fuel gas from which carbon dioxide has been removed by allowing an absorption liquid to absorb the carbon dioxide contained in the fuel gas in a carbon dioxide absorption tower 37 described below of the carbon dioxide separation and recovery device 200 from the carbon dioxide separation and recovery device 200 through a fuel line 3 via a third fuel gas heater 12 and a second fuel gas heater 10 in series.

The fuel gas from the second shift reactor 7 is cooled by heat exchange in the first fuel gas heater 8 and supplied to a second process gas evaporator 9 disposed downstream of the first fuel gas heater 8.

The hydrogen-rich fuel gas, from which carbon dioxide has been removed, supplied through the fuel line 3 is heated by heat exchange with the fuel gas flowing down the second shift reactor 7 in the first fuel gas heater 8 and supplied through the combustor inlet port line 44 to the combustor 71 of the gas turbine device. The hot combustion gas generated by burning the hydrogen-rich fuel gas in this combustor 71 is supplied to the gas turbine 72 to drive the gas turbine 72, which rotates the generator 22 to generate electric power.

The fuel gas cooled by heat exchange in the first fuel gas heater 8 is supplied to the second process gas evaporator 9 disposed downstream of the first fuel gas heater 8. The second process gas evaporator 9 is supplied with part of the steam generated in the exhaust heat recovery boiler 20 through a feed-water line 29.

The hot steam generated by heat exchange with the hot fuel gas in the second process gas evaporator 9 flows down a steam line 35 and is supplied as a heat source to a carbon dioxide absorption liquid heater 39 described below to heat an absorption liquid of the carbon dioxide separation and recovery device 200 shown in FIG. 3.

Also, the fuel gas cooled by heat exchange with cold steam supplied from the exhaust heat boiler 20 through the feed-water line 29 in the second process gas evaporator 9 flows into the second fuel gas heater 10, where it is cooled by heat exchange with the fuel gas, from which carbon dioxide has been removed, supplied from the carbon dioxide separation and recovery device 200 through the fuel line 3, and the cooled fuel gas flows into a third shift reactor 11 disposed downstream of the second fuel gas heater 10.

The inside of the third shift reactor 11 is also filled with a catalyst to cause a shift reaction to convert carbon monoxide in a fuel gas into carbon dioxide. This catalyst filling the third shift reactor 11 completes the shift reaction to convert carbon monoxide in the fuel gas into carbon dioxide.

The hot fuel gas heated by shift reaction heat in the third shift reactor 11 flows into the third fuel gas heater 12 disposed downstream of this third shift reactor 11 and is cooled by heat exchange with the fuel gas supplied through the fuel line 3, and supplies to a third process gas evaporator 13 disposed downstream of the third fuel gas heater 12. The third process gas evaporator 13 is supplied through a feed-water line 25 with part of the feed water supplied to the exhaust heat recovery boiler 20.

The hot steam generated by heat exchange with a hot fuel gas in the third process gas evaporator 13 flows down a steam line 36 and is supplied as a heat source to the carbon dioxide absorption liquid heater 39 described below to heat an absorption liquid of the carbon dioxide separation and recovery device 200 shown in FIG. 3.

The fuel gas cooled by heat exchange with cold steam supplied from the exhaust heat boiler 20 through the feed-water line 25 in the third process gas evaporator 13 flows into a process gas cooler 14, before flowing into a first knock-out drum 15. The fuel gas is supplied from this first knock-out drum 15 through a process gas line 16 to the carbon dioxide absorption tower 37.

Then the carbon dioxide contained in the fuel gas supplied to the carbon dioxide absorption tower 37 is absorbed by an absorption liquid and removed in this carbon dioxide absorption tower 37.

In the carbon dioxide separation and recovery device 200 shown in FIG. 3, the carbon dioxide absorption tower 37 to produce a fuel gas from which carbon dioxide has been removed by allowing an absorption liquid to absorb the carbon dioxide contained in a hydrogen-rich fuel gas flowing down the first knock-out drum 15 and a carbon dioxide flash tank 38, which is an absorption liquid recycling device to recycle the absorption liquid by separating carbon dioxide from the absorption liquid which has absorbed carbon dioxide, are provided.

In the first knock-out drum 15, excess moisture in a shift reaction is separated from fuel gas and discharged from the system through a drain line 42, and the hydrogen-rich fuel, from which moisture has been separated, containing a high proportion of carbon dioxide gas is supplied through the process gas line 16 to the carbon dioxide absorption tower 37.

Then the cold hydrogen-rich gas from which carbon dioxide has been absorbed by an absorption liquid in the carbon dioxide absorption tower 37 is introduced into a second knock-out drum 40 disposed downstream of the carbon dioxide absorption tower 37 through a fuel gas line 43. After the mist of an absorption liquid is separated, the hydrogen rich gas is pressurized in a fuel gas booster compressor 41 and supplied through the fuel line 3 and the combustor inlet port line 44 to the combustor 71 of the gas turbine device, where it is burned.

Meanwhile, the mist of an absorption liquid separated in the second knock-out drum 40 flows into the carbon dioxide flash tank 38.

The absorption liquid which has absorbed carbon dioxide contained in the fuel gas in the carbon dioxide absorption tower 37 is heated in the carbon dioxide absorption liquid heater 39 disposed in an absorption liquid line 77, and heated absorption liquid flows into the carbon dioxide flash tank 38, which is an absorption liquid recycling device. In this carbon dioxide flash tank 38, the carbon dioxide absorbed by an absorption liquid is separated by flashing.

The carbon dioxide separated from the absorption liquid is introduced from the carbon dioxide flash tank 38 into carbon dioxide storage (not shown in the figures) outside the system through a carbon dioxide line 50.

Also, the lean absorption liquid from which carbon dioxide has been separated by flashing in the carbon dioxide flash tank 38, which is an absorption liquid recycling device is pressurized by a circulation pump 48, and supplies through a lean liquid line 49 to the carbon dioxide absorption tower 37. The lean liquid absorbs carbon dioxide contained in the fuel gas again in this carbon dioxide absorption tower 37 and is again supplied through the absorption liquid line 77 to the carbon dioxide flash tank 38.

Meanwhile, the hydrogen-rich fuel gas from which the mist of an absorption liquid has been separated in the second knock-out drum 40 is pressurized in the fuel gas booster compressor 41 and flows down the fuel line 3 into the third fuel gas heater 12 and the second fuel gas heater 10, where it is heated. Then the hydrogen-rich fuel gas is further heated in the first fuel gas heater 8 by heat exchange with the hot fuel gas and supplied through the combustor inlet port line 44 to the combustor 71 of the gas turbine device, where it is burned.

The steam from the first process gas evaporator 6 is supplied through the steam line 34 to the shift steam mixer 4 and mixed with the fuel gas flowing through the inlet port gas line 1 in the shift steam mixer 4, and flows into the first shift reactor 5 as shift steam.

Also, auxiliary steam is introduced into the first shift reactor 5 from the exhaust heat recovery boiler 20 through the steam line 32 to be used as shift steam. When the amount of steam generated by heat exchange with the fuel gas to be supplied to the shift steam mixer 4 via the steam line 34 is not sufficient in the process gas evaporator 6 which recovers shift reaction heat generated in the first shift reactor 5, this auxiliary steam compensates for the shortage of shift steam used in the first shift reactor 5.

In the power generation plant 100 shown in FIG. 1, the exhaust steam from the steam turbine 23 is cooled in the condenser 24 to become condensed water, part of which is supplied to the third process gas evaporator 13 via the feed-water line 25. In this third process gas evaporator 13, the condensed water becomes steam by heat exchange with the hot fuel gas and is supplied through the steam line 36 to the carbon dioxide absorption liquid heater 39 of the carbon dioxide separation and recovery device 200 to be used as a heat source.

The condensed water flowing down the condensate line 26 is pressurized by the feed-water pump 27 and supplied as feed water to the exhaust heat recovery boiler 20, where it is heated by hot exhaust gas discharged from the gas turbine 72. This heated feed water is supplied through the feed-water line 29 to the second process gas evaporator 9 as steam that exchanges heat with the fuel gas.

Then this steam becomes hot steam by heat exchange with the hot fuel gas in the second process gas evaporator 9 and is supplied through the steam line 35 to the carbon dioxide absorption liquid heater 39 of the carbon dioxide separation and recovery device 200 as a heat source.

The steam generated by being heated by the hot exhaust gas discharged from the gas turbine 72 in the intermediate-pressure drum 30 of the exhaust heat recovery boiler 20 is supplied through the intermediate-pressure drum super-heated steam line 33 to the steam turbine 23 and drives the steam turbine 23, which rotates the generator 22 to generate electric power.

Part of the feed water heated in the exhaust heat recovery boiler 20 is supplied through the feed-water line 28 to the first process gas evaporator 6, where it becomes heating steam by heat exchange with the hot fuel gas. This heating steam is supplied through the steam line 34 to the shift steam mixer 4 and then supplied through the inlet port gas line 1 to the first shift reactor 5 as shift steam together with the hot fuel gas.

The condensed water flowing down the condensate line 26 is pressurized by the feed-water pump 27 and supplied as feed water to the exhaust heat recovery boiler 20, where it is heated by the hot exhaust gas discharged from the gas turbine 72. This heated feed water is supplied through the feed-water line 29 to the second process gas evaporator 9 as a steam source which exchanges heat with the hot fuel gas.

Then this heated feed water becomes hot steam by heat exchange with the hot fuel gas in the second process gas evaporator 9 and is supplied through the steam line 35 to the carbon dioxide absorption liquid heater 39 of the carbon dioxide separation and recovery device 200 as a heat source.

The hydrogen-rich fuel gas from which carbon dioxide has been removed by allowing an absorption liquid to absorb carbon dioxide contained in the fuel gas in the carbon dioxide absorption tower 37 of the carbon dioxide separation and recovery device 200 is heated by heat exchange with the hot fuel gas in the third fuel gas heater 12, the second fuel gas heater 10, and the first fuel gas heater 8, each disposed in the gas turbine fuel line 3, in series. Eventually, the hydrogen-rich gas is heated to the temperature level of the hot fuel gas passing through the shift reactor bypass line 2 branched off from the inlet port gas line 1 to connect to the combustor inlet port line 44.

Of the fuel gas supplied to the carbon dioxide separation and recovery device 200, about 30% is supplied through the inlet port gas line 1, and about 70% is supplied through the shift reactor bypass line 2.

The fuel gas flowing down the shift reactor bypass line 2 and the fuel gas flowing down the fuel line 3 after being treated by each device of the carbon dioxide separation and recovery device 200 converge in the combustor inlet port line 44 are supplied to the combustor 71 of the gas turbine device, and burned therein.

Next, the temperature distribution of each process gas, carbon dioxide gas, and an absorption liquid and their advantages in the first embodiment of the gasification power generation system provided with a carbon dioxide separation and recovery system of the present invention are described hereinafter with reference to FIG. 5.

Figure 5:
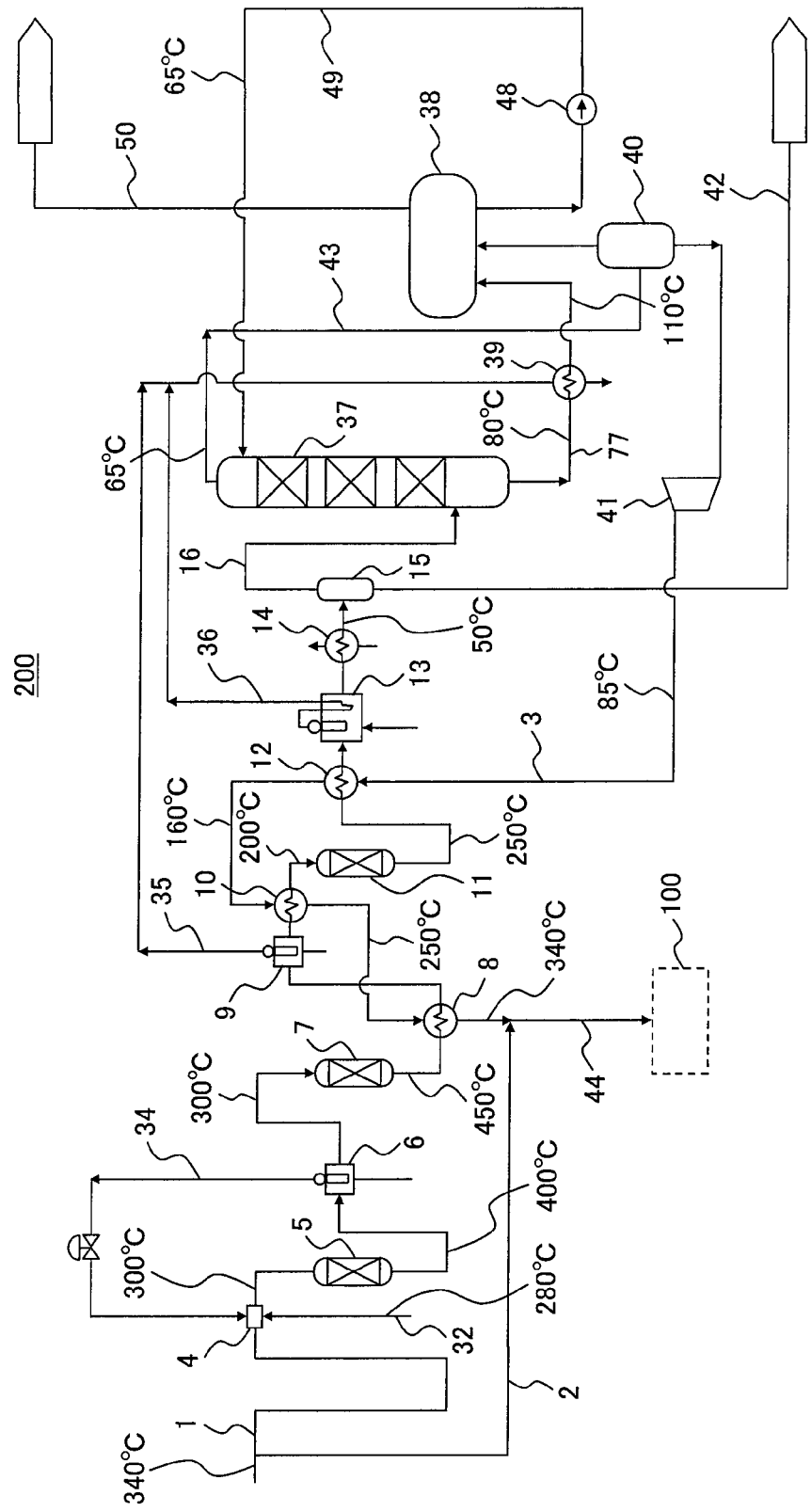
FIG. 5 is a temperature distribution state diagram showing designed temperature conditions of fluids flowing in each line in the carbon dioxide separation and recovery device provided in the gasification power generation system in the first embodiment of the present invention shown in FIG. 3.

The temperature distribution of each process gas, carbon dioxide gas, and an absorption liquid in the first embodiment of the gasification power generation system provided with a carbon dioxide separation and recovery system of the present invention shown in FIG. 5 is an example when an absorption liquid is heated to 110° C. by steam supplied as a heat source to the carbon dioxide absorption liquid heater 39 when the temperature of the absorption liquid at the outlet port of the carbon dioxide absorption tower 37 is 80° C.

In the first embodiment of the gasification power generation system provided with a carbon dioxide separation and recovery system of the present invention shown in FIG. 5, the steam generated in the first process gas evaporator 6 by heat exchange with a fuel gas heated by the heat energy of a shift reaction in the shift reactor 5 is introduced through the steam line 34 into the shift steam mixer 4, where it is mixed with a fuel gas, and flows into the first shift reactor 5 and the second shift reactor 7 as shift steam.

As a result, the steam supplied from the first process gas evaporator 6 through the steam line 34 to the shift mixer 4 is utilized as shift steam to be used for a shift reaction in the first shift reactor 5 and the second shift reactor 7, making it possible to reduce steam for shifting which is extracted from the exhaust heat recovery boiler 20 to be supplied to the shift steam mixer 4 as auxiliary steam.

Since the amount of steam supplied from the exhaust heat recovery boiler 20 to the shift steam mixer 4 as auxiliary steam can be reduced, the amount of steam supplied from the exhaust heat recovery boiler 20 to the steam turbine 23 can be increased by the reduced amount, thus increasing the output of the steam turbine 23 to improve plant power generation efficiency.

Also as shown in FIG. 5, the steam generated in the second process gas evaporator 9 and the steam generated in the third process gas evaporator 13 are introduced through the steam lines 35 and 36 into the carbon dioxide absorption liquid heater 39. This steam heats the carbon dioxide-rich absorption liquid from the carbon dioxide absorption tower 37 from 80° C. to 110° C. in the carbon dioxide absorption liquid heater 39.

Next, the rich absorption liquid flowing down the carbon dioxide absorption liquid heater 39 is introduced into the carbon dioxide flash tank 38 disposed at the rear stage. In the carbon dioxide flash tank 38, the carbon dioxide absorbed in the rich absorption liquid is removed by flashing.

Then the absorption liquid from which carbon dioxide has been removed is returned from the carbon dioxide flash tank 38 through the lean liquid line 49 to the carbon dioxide absorption tower 37. In other words, the absorption liquid circulates between the carbon dioxide absorption tower 37 and the carbon dioxide flash tank 38.

When the configuration of the first embodiment is applied to a gasification power generation system provided with a carbon dioxide separation and recovery device with a plant output level of 170 MW, the power generation efficiency of the gasification power generation system is expected to improve by roughly a few tenths of a percent, although it may vary slightly depending on the type, performance, and circulation amount of the absorption liquid.

More specifically, in the first embodiment, to supply hot steam necessary for a shift reaction to convert carbon monoxide into carbon dioxide in the first shift reactor 5 and the second shift reactor 7 of the carbon dioxide separation and recovery device 200, the steam generated in the first process gas evaporator 6 is supplied through the steam line 34 to the shift steam mixer 4 to flow into the first shift reactor 5 and the second shift reactor 7 as shift steam, making it possible to reduce the amount of auxiliary steam to be supplied from the exhaust heat recovery boiler 20 through the steam line 32 to the shift steam mixer 4. This increases power generation efficiency by the amount of heat energy corresponding to the amount of reduced auxiliary steam, thus improving the power generation efficiency of the gasification power generation system provided with a carbon dioxide separation and recovery device.

According to the present embodiment, in a gasification power generation system which generates power by burning a gasified fuel gas containing carbon monoxide in a gas turbine, there can be provided a gasification power generation system provided with a carbon dioxide separation and recovery device in which shift reaction heat generated by a shift reaction to convert carbon monoxide contained in fuel gas into carbon dioxide is effectively recovered in the carbon dioxide separation and recovery device to recover carbon dioxide, and shift steam to supply steam generated by an exhaust heat recovery boiler to a steam mixer is reduced, thereby improving the power generation efficiency of the power generation system.

Embodiment 2

Next, the second embodiment of the gasification power generation system provided with a carbon dioxide separation and recovery system of the present invention is described hereinafter with reference to FIG. 2 and FIG. 4.

Since the gasification power generation system provided with a carbon dioxide separation and recovery in accordance with the second embodiment of the present invention and the gasification power generation system provided with a carbon dioxide separation and recovery in accordance with the first embodiment shown in FIG. 1 and FIG. 3 are the same in basic configuration, the explanation of the commonalities in configuration between the two will be omitted and only the differences in configuration will be described hereinafter.

Figure 2:
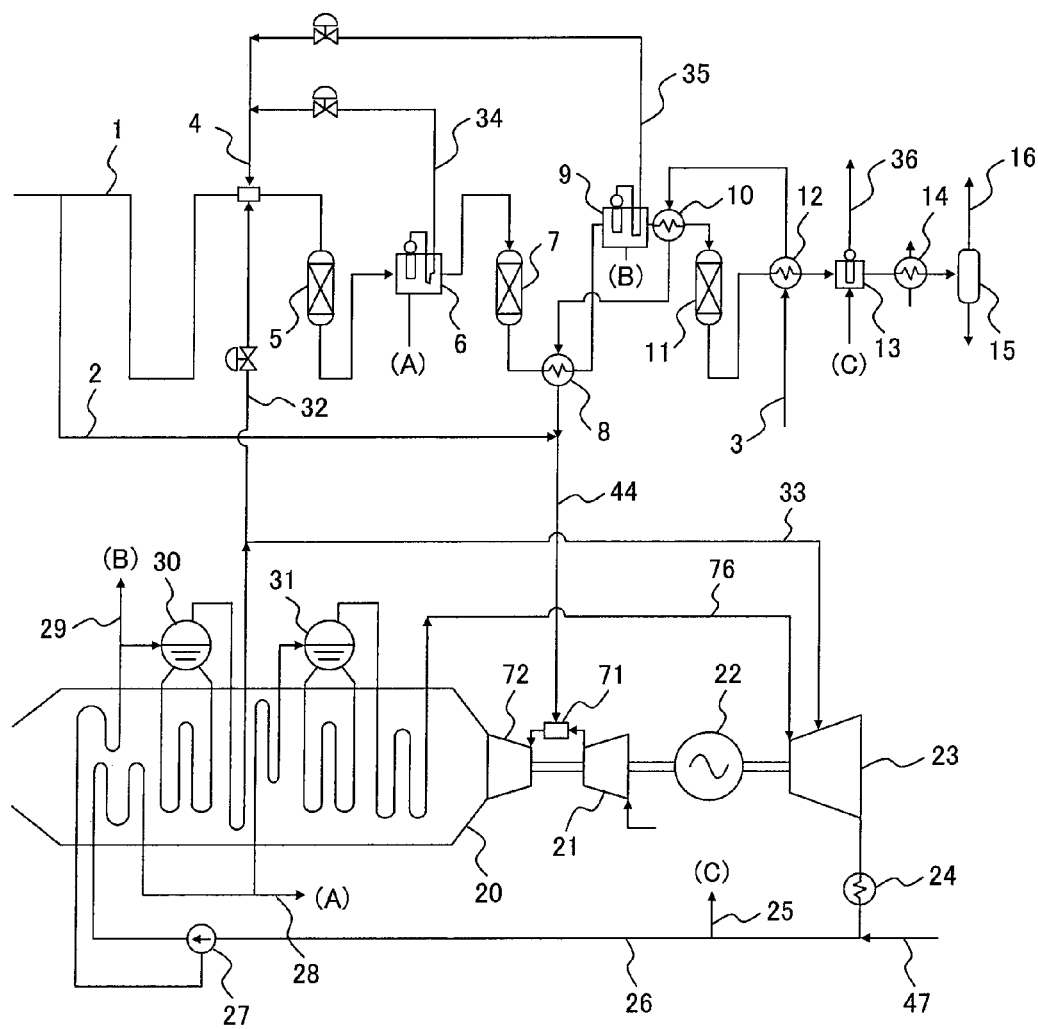
FIG. 2 is a schematic flow diagram of a gasification power generation system provided with a carbon dioxide separation and recovery device in accordance with a second embodiment of the present invention.
Figure 4:
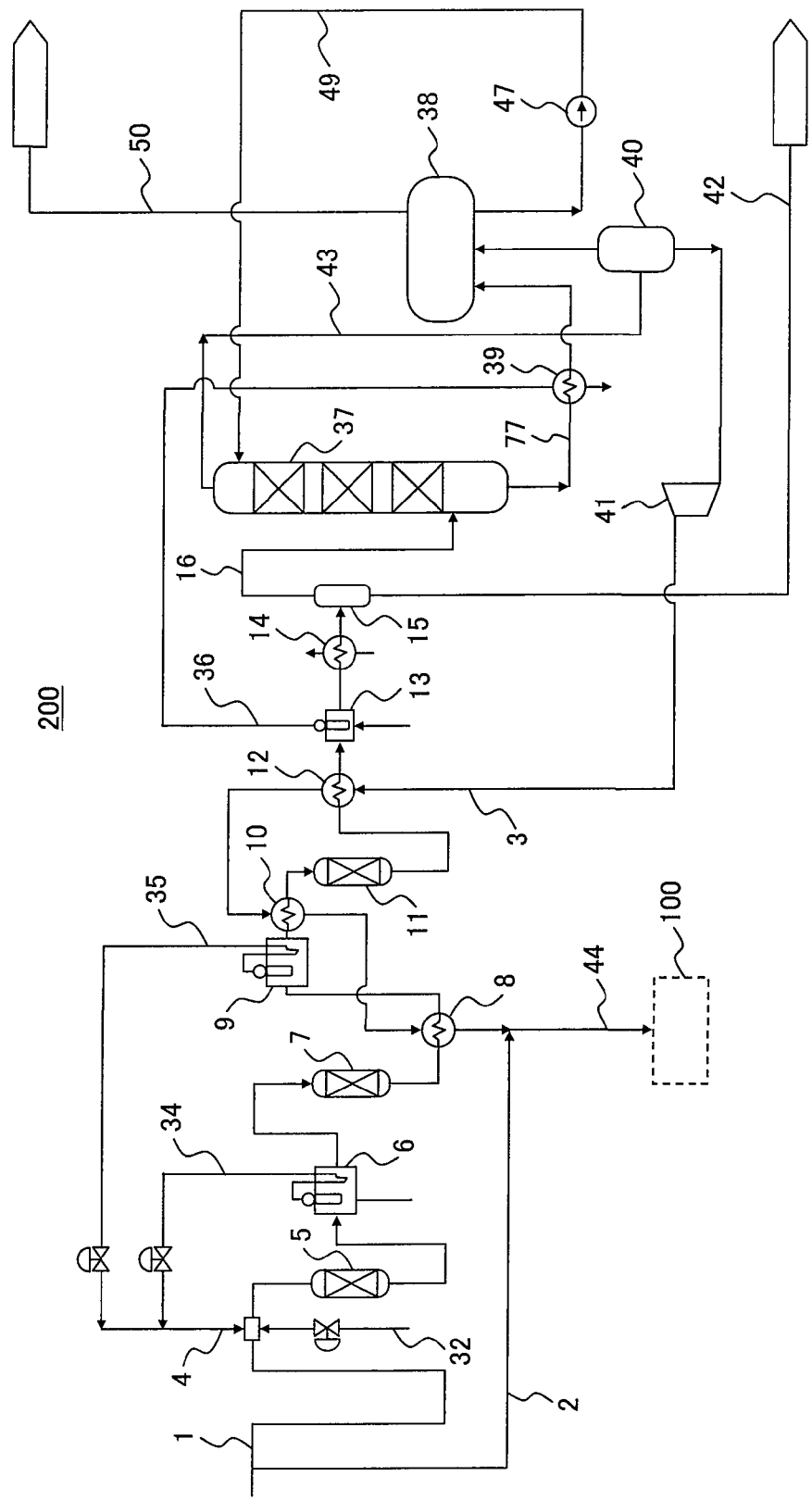
FIG. 4 is a flow diagram showing a schematic framework of the carbon dioxide separation and recovery device provided in the gasification power generation system in the second embodiment of the present invention shown in FIG. 2.

In the gasification power generation system provided with a carbon dioxide separation and recovery system in accordance with the second embodiment of the present invention shown in FIG. 2 and FIG. 4, each of the steams generated by heat exchange with a fuel gas in a first process gas evaporator 6 and a second process gas evaporator 9 of a carbon dioxide separation and recovery device 200 is supplied through a steam line 34 and a steam line 35, respectively, to a shift steam mixer 4 disposed in an inlet port gas line 1 upstream of a first shift reactor 5 as shift steam for a shift reaction.

As a result, the shift steam for a shift reaction used in the first shift reactor 5 and a second shift reactor 7 is covered by these steams generated in the first process gas evaporator 6 and the second process gas evaporator 9, reducing the amount of auxiliary steam to be supplied from an exhaust heat recovery boiler 20 through a steam line 32 to the shift steam mixer 4 by as much as possible. This increases power generation efficiency by the amount of heat energy corresponding to the amount of reduced auxiliary steam, thus making it possible to improve the power generation efficiency of the gasification power generation system provided with a carbon dioxide separation and recovery device.

More specifically, in FIG. 4, to supply hot steam necessary for a shift reaction to convert carbon monoxide into carbon dioxide in the first shift reactor 5 and the second shift reactor 7 of a carbon dioxide separation and recovery device 200, the steams generated in the first process gas evaporator 6 and the second process gas evaporator 9 are supplied through the steam line 34 and the steam line 35, respectively, to the shift steam mixer 4, making it possible to significantly reduce the amount of auxiliary steam to be supplied from the exhaust heat recovery boiler 20 through the steam line 32 to the shift steam mixer 4. This increases power generation efficiency by the amount of heat energy corresponding to the amount of reduced auxiliary steam, thus improving the power generation efficiency of the gasification power generation system provided with a carbon dioxide separation and recovery device.

Next, the temperature distribution of each process gas, carbon dioxide gas, and an absorption liquid and their advantages in the second embodiment of the gasification power generation system provided with a carbon dioxide separation and recovery system of the present invention are described hereinafter with reference to FIG. 6.

Figure 6:
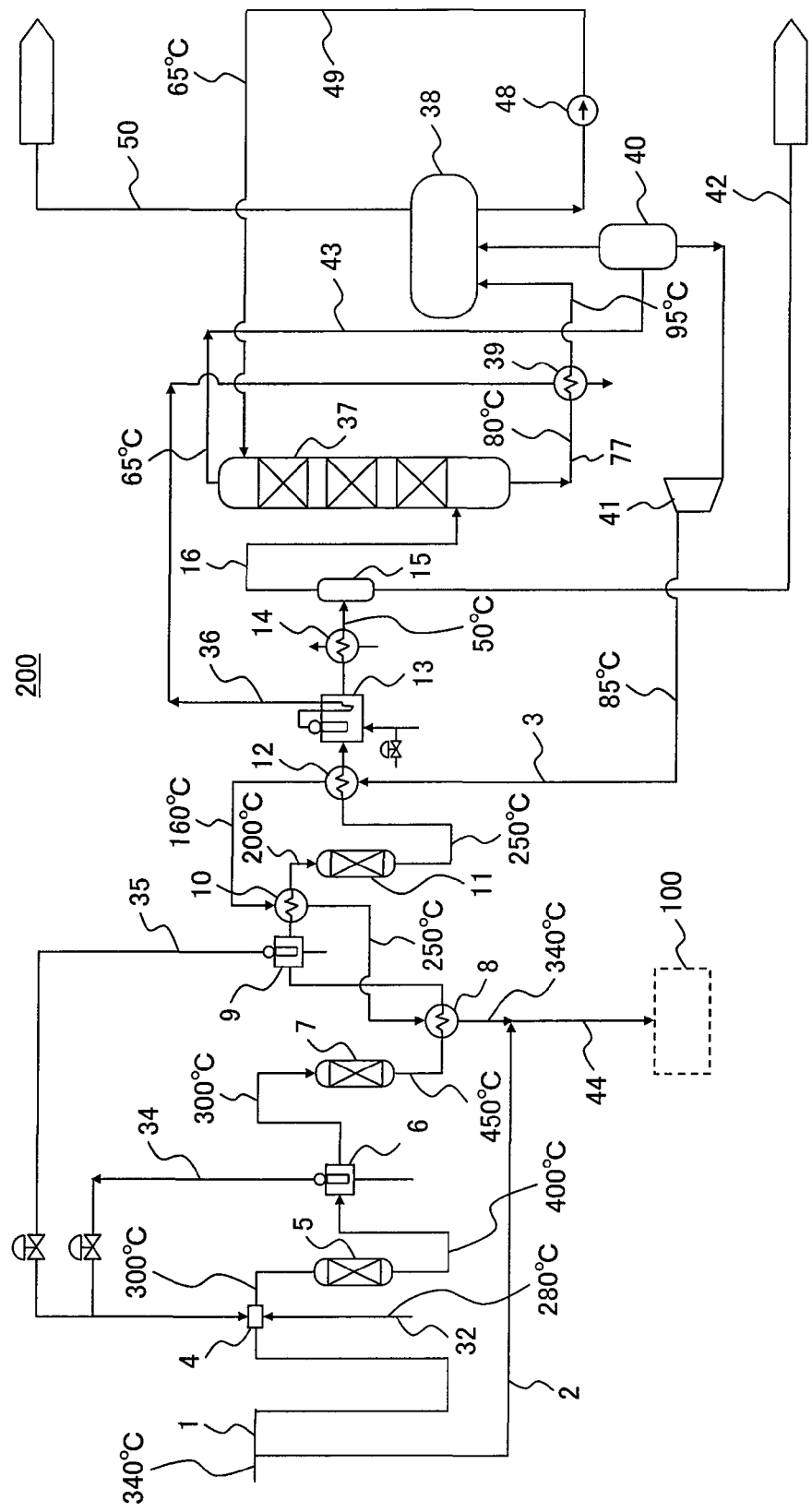
FIG. 6 is a temperature distribution state diagram showing designed temperature conditions of fluids flowing in each line in the carbon dioxide separation and recovery device provided in the gasification power generation system in the second embodiment of the present invention shown in FIG. 4.

The temperature distribution of each process gas, carbon dioxide gas, and an absorption liquid shown in FIG. 6 is an example when an absorption liquid is heated to 95° C. by a carbon dioxide absorption liquid heater 39 when the temperature of the absorption liquid at the outlet port of the carbon dioxide absorption tower 37 is 80° C.

In the second embodiment of the gasification power generation system provided with a carbon dioxide separation and recovery system of the present invention shown in FIG. 6, the steam generated in the first process gas evaporator 6 by heat exchange with fuel gas heated by the heat energy of a shift reaction in the shift reactor 5 and the steam generated in the second process gas evaporator 9 by heat exchange with fuel gas heated by the heat energy of a shift reaction in the shift reactor 7 are introduced through the steam line 34 and the steam line 35, respectively, into the shift steam mixer 4.

The temperature of the fuel gas flown from the first shift reactor 5 is as high as 400° C. However, the fuel gas drops in temperature to 300° C. by passing through the first process gas evaporator 6. This fuel gas absorbs the reaction heat of a shift catalyst by passing through the second shift reactor 7 and is heated to 450° C.

This fuel gas heated to 450° C. drops in temperature to 200° C. by passing through the second process gas evaporator 9. This fuel gas further drops in temperature to 50° C. by passing through a third process gas evaporator 13.

The hydrogen-rich fuel gas from which carbon dioxide has been removed in a carbon dioxide flash tank 38 by separating carbon dioxide from the absorption liquid which has absorbed carbon dioxide contained in a fuel gas in a carbon dioxide absorption tower 37 of the carbon dioxide separation and recovery device 200 is heated to 85° C. by being pressurized by a compressor 41.

Next, the fuel gas pressurized by the compressor 41 passes through a third fuel gas heater 12 and is heated to 160° C. Then the fuel gas passes through a second fuel gas heater 10 and is heated to 250° C. This fuel gas is further heated to 340° C. by passing through a first fuel gas heater 8.

After being heated to a temperature equivalent to 340° C., which is the temperature of the fuel gas flowing through a shift reactor bypass line 2 to bypass shift reactors of the carbon dioxide separation and recovery device 200, the fuel gas converges with the fuel gas flowing through this shift reactor bypass line 2 to be supplied to a combustor 71 of a gas turbine device and burned to drive the gas turbine 72.

Meanwhile, the absorption liquid which has absorbed carbon dioxide contained in a fuel gas in the carbon dioxide absorption tower 37 of the carbon dioxide separation and recovery device 200 is heated from 80° C. to 95° C. in the carbon dioxide absorption liquid heater 39 by heat exchange with steam supplied from the third process gas evaporator 13 through a steam line 36.

Then the absorption liquid from the carbon dioxide absorption liquid heater 39 is supplied to the carbon dioxide flash tank 38, where it becomes a lean absorption liquid at 65° C. by having the carbon dioxide absorbed in the absorption liquid separated by flashing. The lean liquid from which carbon dioxide has been removed is returned through a lean liquid line 49 to the carbon dioxide absorption tower 37. In other words, the absorption liquid circulates between the carbon dioxide absorption liquid heater 39 and the carbon dioxide flash tank 38.

More specifically, in the second embodiment, a flowing fuel gas is heated by heat energy generated by a shift reaction in the first shift reactor 5 and the second shift reactor 7, and the steam generated by heat exchange with this heated fuel gas is supplied through the steam line 34 and the steam line 35 to the steam mixer 4 to be effectively utilized as shift steam to be used in shift reactors, making it possible to reduce the amount of steam extracted from the exhaust heat recovery boiler 20 for shifting. As a result, the amount of steam supplied from the exhaust heat recovery boiler 20 to drive a steam turbine 23 increases, thus increasing the output of the steam turbine 23 to improve plant power generation efficiency.

Furthermore, the steam generated in the third process gas evaporator 13 by heat exchange with the fuel gas heated by heat energy of a shift reaction in a shift reactor 11 is introduced through the steam line 36 into the carbon dioxide absorption liquid heater 39 to be utilized in heating the absorption liquid flowing down the carbon dioxide absorption tower 37. By effectively utilizing the steam generated by shift reaction heat of shift reactors in the carbon dioxide separation and recovery device 200, the power generation efficiency of the gasification power generation system is improved.

When the present embodiment is applied to a gasification power generation system provided with a carbon dioxide separation and recovery device with a plant output level of 170 MW, the plant power generation efficiency is expected to improve by roughly a few tenths of a percent, although it may vary slightly depending on the type, performance, and circulation amount of the absorption liquid. Since more steam generated by utilizing shift reaction heat is used as steam for a shift reaction in the second embodiment than in the first embodiment, the plant power generation efficiency in the second embodiment is equivalent to or slightly better than that in the first embodiment.

According to the present embodiment, in a gasification power generation system that generates power by burning a gasified fuel gas containing carbon monoxide in a gas turbine, there can be provided a gasification power generation system provided with a carbon dioxide separation and recovery device in which shift reaction heat generated by a shift reaction to convert carbon monoxide contained in a fuel gas into carbon dioxide is effectively recovered in the carbon dioxide separation and recovery device to recover carbon dioxide, and shift steam to supply steam generated by an exhaust heat recovery boiler to a steam mixer is reduced, thereby improving the power generation efficiency of the power generation system.

The present invention is applicable to gasification power generation systems provided with a carbon dioxide separation and recovery device.

What is claimed is:

1. A gasification power generation system provided with a carbon dioxide separation and recovery device comprising:
the carbon dioxide separation and recovery device having:

a shift reactor to convert carbon monoxide contained in fuel gas into carbon dioxide by mixing steam into the fuel gas containing carbon monoxide and hydrogen to cause a shift reaction;

a carbon dioxide absorption tower to produce fuel gas from which carbon dioxide has been removed by allowing an absorption liquid to absorb carbon dioxide from the fuel gas containing carbon dioxide flowing down the shift reactor; and an absorption liquid recycling device to recycle the absorption liquid by separating carbon dioxide absorbed by the absorption liquid in the carbon dioxide absorption tower; and a gasification power generation system having:

a gas turbine device driven by burning the fuel gas from which carbon dioxide has been removed in the carbon dioxide absorption tower of the carbon dioxide separation and recovery device in a combustor;

an exhaust heat recovery boiler having a drum to generate steam by an exhaust gas discharged from the gas turbine device; and a steam turbine driven by the steam generated by the drum of the exhaust heat recovery boiler;

wherein an evaporator to generate steam heated by heat exchange with the fuel gas heated by shift reaction heat generated in the shift reactor of the carbon dioxide separation and recovery device is disposed downstream of the shift reactor, a steam line to supply a steam mixer disposed in a fuel gas line upstream of the shift reactor with the heated steam generated by the evaporator is provided, and the heated steam supplied through the steam line is allowed to flow from the steam mixer into the shift reactor as shift steam together with the fuel gas.

2. The gasification power generation system provided with a carbon dioxide separation and recovery device according to claim 1, wherein a second shift reactor to convert carbon monoxide contained in fuel gas into carbon dioxide by mixing steam into the fuel gas to cause a shift reaction is disposed downstream of the shift reactor, a second evaporator to heat steam by heat exchange between the fuel gas heated by shift reaction heat generated in the second shift reactor and the steam supplied from the exhaust heat recovery boiler is disposed downstream of the second shift reactor, an absorption liquid heater is disposed in a line to supply an absorption liquid which has absorbed carbon dioxide in the carbon dioxide absorption tower of the carbon dioxide separation and recovery device from the carbon dioxide absorption tower to the absorption liquid recycling device, and a steam line to supply steam generated in the second evaporator as a heat source for the absorption liquid heater is provided.

3. The gasification power generation system provided with a carbon dioxide separation and recovery device according to claim 1, wherein a fuel gas heater to heat fuel gas by heat exchange with the fuel gas heated by shift reaction heat generated in the shift reactor of the carbon dioxide separation and recovery device is disposed in a line to supply the combustor with fuel gas from which carbon dioxide has been removed in the carbon dioxide absorption tower of the carbon dioxide separation and recovery device, and the fuel gas heated by the fuel gas heater is supplied to the combustor.

4. A gasification power generation system provided with a carbon dioxide separation and recovery device comprising:

the carbon dioxide separation and recovery device having:

a first shift reactor and a second shift reactor disposed downstream of the first shift reactor to convert carbon monoxide in fuel gas into carbon dioxide by mixing steam into the fuel gas containing carbon monoxide and hydrogen to cause a shift reaction;

a carbon dioxide absorption tower to produce fuel gas from which carbon dioxide has been removed by allowing an absorption liquid to absorb carbon dioxide from the fuel gas containing carbon dioxide flowing down both of the shift reactors; and an absorption liquid recycling device to recycle the absorption liquid by separating carbon dioxide absorbed by the absorption liquid in the carbon dioxide absorption tower;

a gasification power generation system having:

a gas turbine device driven by burning the fuel gas from which carbon dioxide has been removed in the carbon dioxide absorption tower of the carbon dioxide separation and recovery device in a combustor;

an exhaust heat recovery boiler having a drum to generate steam by an exhaust gas discharged from the gas turbine device; and a steam turbine driven by the steam generated by the drum of the exhaust heat recovery boiler;

wherein a first evaporator to generate steam heated by heat exchange with the fuel gas heated by shift reaction heat generated in the first shift reactor of the carbon dioxide separation and recovery device is disposed downstream of the first shift reactor, a second evaporator to generate steam heated by heat exchange with the fuel gas heated by shift reaction heat generated in the second shift reactor of the carbon dioxide separation and recovery device is disposed downstream of the second shift reactor, steam lines to supply a steam mixer disposed in a fuel gas line upstream of the first shift reactor with the heated steam generated by each of the first and second evaporators are provided, and the heated steam supplied through these steam lines is allowed to flow from the steam mixer into the first shift reactor and the second shift reactor as shift steam together with the fuel gas.

5. The gasification power generation system provided with a carbon dioxide separation and recovery device according to claim 4, wherein a third evaporator to heat steam by heat exchange between the fuel gas heated by shift reaction heat generated in the second shift reactor and the steam supplied from the exhaust heat recovery boiler is disposed downstream of the second shift reactor, an absorption liquid heater is disposed in a line to supply the combustor with fuel gas from which carbon dioxide has been removed in the carbon dioxide absorption tower of the carbon dioxide separation and recovery device, and a steam line to supply the steam generated in the third evaporator as a heat source for the absorption liquid heater is provided.

6. The gasification power generation system provided with a carbon dioxide separation and recovery device according to claim 4, wherein a fuel gas heater to heat fuel gas from which carbon dioxide has been removed by heat exchange with the fuel gas heated by shift reaction heat generated in the shift reactor of the carbon dioxide separation and recovery device is disposed in a line to supply the combustor with the fuel gas from which carbon dioxide has been removed in the carbon dioxide absorption tower of the carbon dioxide separation and recovery device, and the fuel gas heated by the fuel gas heater is supplied to the combustor.

\* \* \* \* \*